United States Patent [19]

Jacobi

[11] 3,859,436
[45] Jan. 7, 1975

[54] SUGAR COMPOSITION FOR TOPICAL APPLICATION

[75] Inventor: Otto K. Jacobi, Wiesbaden-Igstadt, Germany

[73] Assignee: Kolmar Laboratories, Inc., Port Jervis, N.Y.

[22] Filed: Oct. 2, 1968

[21] Appl. No.: 764,609

[52] U.S. Cl. .............................. 424/180
[51] Int. Cl. ............................ A61k 27/00
[58] Field of Search ....................... 424/180

[56] References Cited
OTHER PUBLICATIONS

Merck Index, 5th Edition, 1940, pp. 255, 318, and 480 (copy in Group 120).

Primary Examiner—Albert T. Meyers
Assistant Examiner—Daren M. Stephens
Attorney, Agent, or Firm—Andrus, Sceales, Starke & Sawall

[57] ABSTRACT

A composition for topical application containing a mixture of glucose, fructose, glucosamine, desoxyribose and ribose. The composition itself can be applied directly to the skin or can be added to cosmetic products and provides a non-irritating, soothing effect for the skin.

2 Claims, No Drawings

SUGAR COMPOSITION FOR TOPICAL APPLICATION

This invention relates to a composition for topical application.

The epidermis or outer layer of the skin is composed of two main layers, the stratum granulosum and the stratum corneum, which is located outwardly with respect to the stratum granulosum and is separated therefrom by a transparent layer of cells called the stratum lucidum. The innermost portion of the epidermis consists of cells which continually divide to replace the corneum layer as the same is worn away. The cells gradually die as they move outwardly to the corneum so that the corneum itself is essentially dead skin consisting mostly of keratin which is a protein material.

Biological research of the stratum corneum has disclosed the presence of sugars such as hexose, pentose, desoxyribose, and glucosamine. In the past it had been generally thought that the sugars in the stratum corneum were bound on nucleic acids, amino acids, proteins and mucoides rather than being present in the free form. More recently, however, it has been determined that the sugars are present in the stratum corneum in both the free form as well as being bound on the amino acids and also probably on the proteins, mucoides and nucleic acids.

In the cosmetic and pharmaceutical field, compositions for the treatment of skin utilizing sugars have been known for many years and have been used for their soothing and, non-irritating properties. The ancient Egyptians recognized the value of honey-salve, and creams of this type are still in use today in the form of honey creams and honey ointments. Honey contains approximately 10 percent cane sugar, 22 to 24 percent glucose and 32 to 49 percent fructose with the remainder being non-sugar constituents. In some cosmetic and pharmaceutical formulations, cane sugar or milks sugars have been substituted for honey. However, disaccharides such as cane sugar and milk sugar, are considerably more irritating to the skin and therefore, it has been suggested to use glusocse instead of cane sugar, milk sugar, or honey, as the honey contains 10 percent cane sugar.

The present invention is directed to a novel sugar composition for topical application which includes the combination of glucose, fructose, glucosamine, desoxyribose and ribose. The sugar composition is substantially less irritating to the skin than conventional topical preparations utilizing honey or cane sugar and provides a soothing and, non-irritating, effect on the skin. Glucose or other mono-saccharides, such as fructose or ribose, by themselves, do not provide the beneficial affects on the skin achieved by the combination of sugars of the invention. The composition of the invention has the following general formulation in weight per cent:

| | |
|---|---|
| Glucose | 1 — 99% |
| Fructose | 1 — 99% |
| Glucosamine | .001 — 40% |
| Desoxyribose | .001 — 40% |
| Ribose | .001 — 60% |

A preferred range of proportions of the composition of the invention is as follows in weight per cent:

| | |
|---|---|
| Glucose | 30 — 95% |
| Fructose | 5 — 40% |
| Glucosamine | .001 — 10% |
| Desoxyribose | .001 — 10% |
| Ribose | .001 — 10% |

In the above formulations the hydrochloric acid salt of glucosamine can be substituted for the glucosamine. While the glucosamine, desoxyribose and ribose can be used in small amounts down to 0.001 percent by weight, these ingredients are important to the composition and should not be eliminated.

The method of preparing the composition of the invention is not critical. Preferably 10 to 20 percent of glycerine and 10 to 20 percent of distilled water are added to the sugar mixture. The components are mixed together and heated to a temperature of about 75°C with stirring. As a clear solution develops, stirring is stopped and the solution is allowed to cool without agitation. After some period of time crystals will build on the upper part of the vessel wall and these crystals are employed to inoculate the solution. After 48 hours the total mixture will be crystalyzed.

The crystalyzed composition can be applied in dry powdered form to the skin or the composition can be added to various cosmetic, and pharmaceutical or proprietary drug preparations in an amount of 0.1 to 99 percent by weight of the preparation. For example, the composition can be added to water solutions, alcohol solutions, salves, emulsions, creams, make-up compositions, lotions, face packs, powder formulations and the like.

While glucose is substantially less irritating to the skin than other sugars, such as cane sugar or milk sugar, it has been found that the sugar composition of the invention is substantially less irritating to the skin than glucose, as shown in the following test on rabbit's skin.

According to the test, a 70 percent by weight water solution of glucose gave an irritation index of 0.38 according to the standard test procedure outlined in the "Appraisal of the Safety of Chemicals in Foods, Drugs and Cosmetics," Food and Drug Official of the United States, 1959.

In contrast to this a water solution containing 70 percent by weight of the following sugars:

6.44 parts glucose
7.00 parts fructose
0.21 parts glucosamine
0.07 parts desoxyribose
0.28 parts ribose gave an irritation index of only 0.13 using the identical test procedure, and a 70 percent by weight solution of the following sugars:

62.944 parts of glucose
7.000 parts fructose
0.021 parts glucosamine
0.007 parts desoxyribose
0.028 parts ribose gave an irritation index of only 0.06.

These test results made according to standard irritation test procedures clearly indicate that the sugar mixture of the invention provides a topical material which is decidedly less irritating to the skin than glucose. Moreover, the sugar composition of the invention also provides soothing effects for the skin which cannot be achieved by use of the individual sugars. The sugar composition is intended to replace the natural sugars which may have been removed from the skin, and also derives its beneficial effects from the fact that it contains sugar components similar to, and compatible with, those of the skin.

The following examples illustrate the preparation of the composition of the invention.

EXAMPLE 1.

50 parts glucose, 10 parts fructose, 15 parts glucosamine, 15 parts ribose and 10 parts desoxyribose, were mixed together with 15 percent by weight of glycerine and 15 percent by weight of distilled water. The components were stirred vigorously and heated on a water bath to 75°C. When a clear solution developed, the agitation was stopped and the solution was cooled without agitation to room temperature. Subsequently, crystals developed on the upper part of the vessel wall and these crystals were employed to inoculate the solution. After 48 hours the total mixture was crystalyzed and the crystalyzed material was ground to a powdered state to provide a dry sugar composition.

EXAMPLE 2.

A composition was prepared in the manner set forth in Example 1, utilizing the following mixture of sugars:
- 92.944 parts glucose
- 7.000 parts fructose
- 0.021 parts glucosamine
- 0.007 parts desoxyribose
- 0.028 parts ribose

EXAMPLE 3.

A sugar composition was prepared in accordance with the procedure of Example 1 utilizing the following mixture of sugars:
- 80.13 parts glucose
- 14.77 parts fructose
- 3.10 parts ribose
- 0.90 parts glucosamine
- 1.10 parts desoxyribose The following examples illustrate the addition of the sugar composition of the invention to various cosmetic and pharmaceutical products:

EXAMPLE 4

Liquid Makeup Formulation

- 5 parts polyethylene glycol 4000
- 5 parts propylene glycol
- 5 parts titanium dioxyde
- 3 parts bentonite
- 2-3 parts color pigments
- 5 parts 1 percent methyl cellulose solution
- 10 parts sugar mixture of Example 3
- 5 parts diethylene-glycolmonolaurate
- 60 parts water

EXAMPLE 5

Face Powder Formulation

- 40 parts talc
- 5 parts magnesium stearate
- 5 parts aluminum stearate
- 40 parts kaolin
- 10 parts sugar mixture of Example 1

EXAMPLE 6

Face Pack Formulation

- 20 parts sodium alginate
- 20 parts bentonite
- 5 parts borax
- 20 parts sugar mixture of Example 3
- 35 parts oatmeal

EXAMPLE 7

Face Mask Formulation

- 10 parts methylcellulose
- 5 parts sugar mixture of Example 2
- 3 parts kaolin
- 1 part glycerin
- 81 parts water

EXAMPLE 8

Skin Clean Formulation

- 10 parts stearic acid
- 0.5 parts cetyl alcohol
- 1 part isopropyl stearate
- 5.2 parts Arlacel 60
- 1.0 part Arlacel 80
- 2.8 parts Tween 60
- 10.0 parts sugar mixture of Example 1
- 69.5 parts water Various modes of carrying out the invention are contemplated as being within the scope of the following claims particularly pointing out and distinctly claiming the subject matter which is regarded as the invention.

I claim:

1. A product for human topical application, comprising a topical base having incorporated therein a non irritating soothing amount of a sugar composition, said composition consisting essentially by weight of:

| | |
|---|---|
| Glucose | 1 — 99% |
| Fructose | 1 — 99% |
| Glucosamine | .001 — 40% |
| Desoxyribose | .001 — 40% |
| Ribose | .001 — 60% |

2. The product of claim 1, wherein the sugar composition comprises from 0.1 to 99 percent by weight of said product.

* * * * *